Aug. 20, 1963     O. W. RICHARDS     3,101,411
LIGHT CONDUCTING DEVICE TO TRANSMIT ULTRA-VIOLET
RADIATION FOR SPECIMEN FLUORESCENCE
UNDER A MICROSCOPE
Filed May 17, 1960
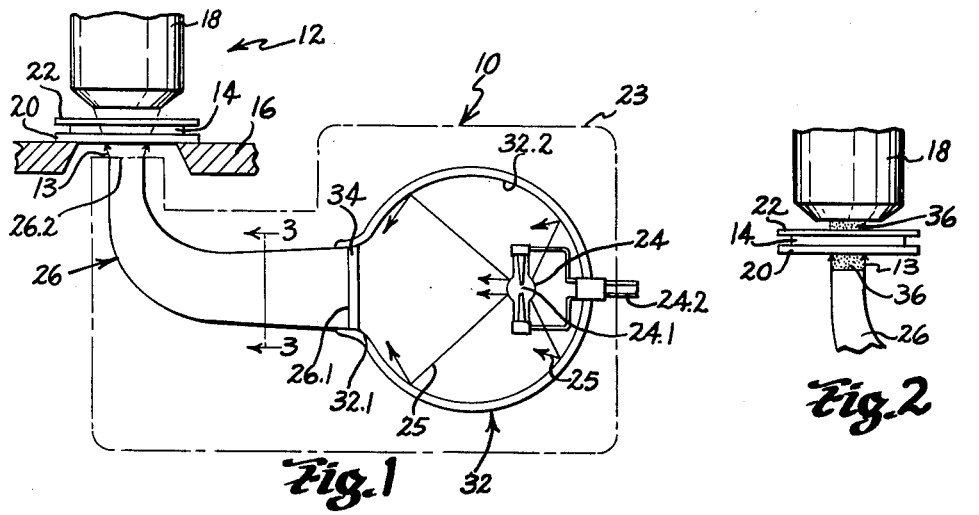
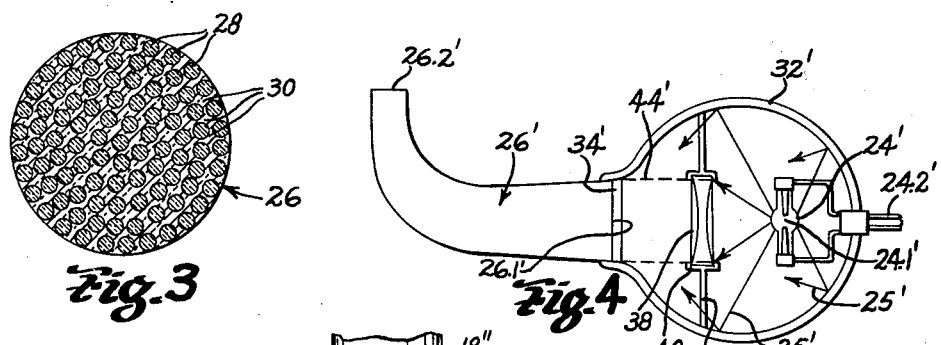
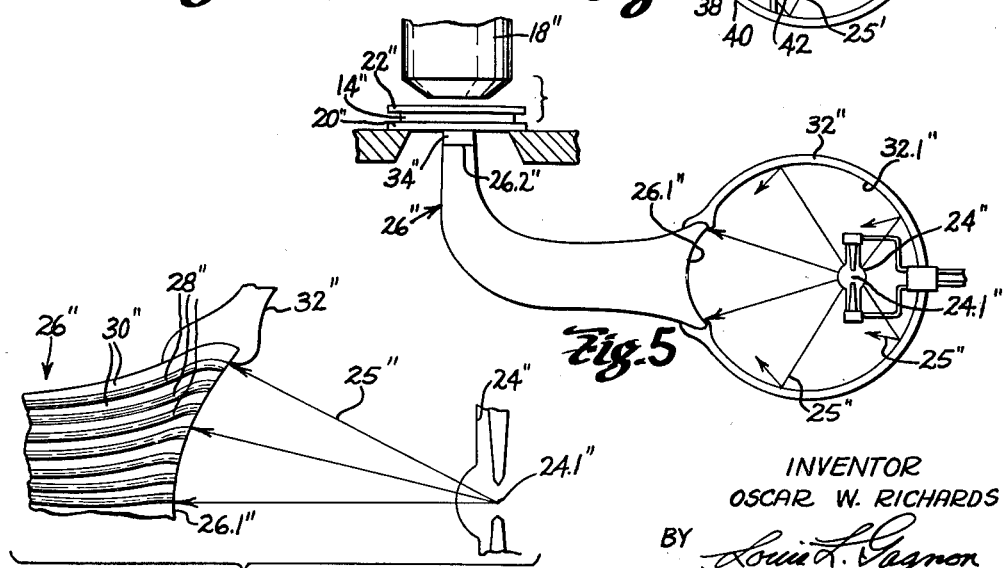
INVENTOR
OSCAR W. RICHARDS
BY
Louis L. Gagnon
James P. McAndrew
ATTORNEYS

United States Patent Office 3,101,411
Patented Aug. 20, 1963

3,101,411
LIGHT CONDUCTING DEVICE TO TRANSMIT ULTRA-VIOLET RADIATION FOR SPECIMEN FLUORESCENCE UNDER A MICROSCOPE
Oscar W. Richards, North Woodstock, Conn., assignor to American Optical Company, Southbridge, Mass., a voluntary association of Massachusetts
Filed May 17, 1960, Ser. No. 29,609
3 Claims. (Cl. 250—83.3)

The field of this invention is that if fluorescene microscopy and the invention relates more particularly to a novel and improved irradiator for use in fluorescence miscroscopy.

In fluorescence microscopy, radiant energy from a selected source is directed through ultraviolet-transmitting filter means for absorption by a specimen mounted upon a microscope stage so that the specimen fluoresces in accordance with its various characteristics and can be viewed with the microscope, a substantial amount of ultraviolet radiation being required for this purpose. In the past, various sources rich in ultraviolet radiation have been utilized and condenser arrangements have been provided for concentrating ultraviolet upon that portion of a specimen to be examined microscopically, but, until the present invention, a relatively low proportion of the ultraviolet radiation supplied has been ultimately absorbed by the specimen so that, even though expensive condenser systems have been used, radiation sources of excessively high power consumption have also been required.

It is an object of this invention to provide a highly efficient irradiator apparatus for use in microscopy; to provide such an apparatus which is adapted to concentrate a substantial amount of radiation upon a specimen to be examined microscopically; to provide such an irradiator which is adapted to furnish a substantial amount of ultraviolet radiation and to concentrate a desirable proportion of said ultraviolet radiation upon that portion of a specimen to be examined microscopically; and to provide such an ultraviolet irradiator which can be operated with relatively low power consumption.

It is a further object of this invention to provide an irradiator for use in fluorescence microscopy which is compactly and simply constructed; to provide such an irradiator which can be conveniently accommodated beneath a microscope stage; to provide such an irradiator which can be readily incorporated in various microscopes presently in use; and to provide such an irradiator which can be economically manufactured.

Another object of this invention is to provide an irradiator having a source of ultraviolet radiation which can be mounted a substantial distance from a microscope stage and having highly efficient means for directing such radiation upon a specimen mounted upon the stage; to provide such an irradiator in which substantially all ultraviolet radiation emitted by the source is directed upon said specimen; and to provide such an irradiator which can be conveniently adjusted for directing ultraviolet radiation upon that portion of a specimen to be examined microscopically.

Briefly, described, the irradiator apparatus provided by this invention comprises a source of radiant energy, including ultraviolet radiation, in combination with a radiation-transmitting device, such as a fiber optical device which preferably tapers from end to end, embodying a multiplicity of radiation-conducting fibers assembled in a spaced side-by-side relation within a radiation-insulating matrix, the device having one end disposed for receiving radiation from the source within the fibers and having its other end disposed for directing radiation transmitted through the fibers upon that portion of a specimen to be examined microscopically. A radiation-integrating means such as sphere having a reflecting inner surface is disposed in surrounding relation to the source and to the radiation-receiving end of the device for directing substantially all radiation from the source within the device fibers, and filter means adapted to transmit only ultraviolet radiation are disposed in sequence with the device. In using the radiation-integrating means, energy radiated from the source in all directions will be channeled within the radiation-conducting fibers at various angles of incidence and with relatively uniform distribution among the fibers, and, since the fibers are each enclosed within a radiation-insulating matrix, will be conducted to the specimen to be fluoresced without substantial loss due to the angle of incidence of the radiation in entering the fibers. Thus, little or no radiation from the source is lost in entering the radiation-transmitting means, and, since no light stop or aperture means are required for providing an uniformly irradiated field, little or no radiation from the source is wasted in being directed upon the specimen to be fluoresced.

Other objects, advantages and details of construction of the apparatus provided by this invention will appear in the following more detailed description of the apparatus, the description referring to the drawing in which:

FIG. 1 is a diagrammatic view of the irradiator apparatus provided by this invention;

FIG. 2 is a partial diagrammatic view similar to FIG. 1 showing the use of immersion fluids with the apparatus provided by this invention;

FIG. 3 is a section view along line 3—3 of FIG. 1;

FIG. 4 is a diagrammatic view similar to FIG. 1 showing an alternate embodiment of the apparatus provided by this invention;

FIG. 5 is a diagrammatic view similar to FIG. 1 showing another alternative embodiment of the apparatus provided by this invention; and FIG. 6 is an enlarged partial section view along the longitudinal axis of the radiation-transmitting device illustrated in FIG. 5.

Referring to the drawing, 10 in FIG. 1 indicates the irradiator apparatus provided by this invention which is shown positioned relative to a microscope 12 for directing ultraviolet radiation, as at 13, upon a specimen 14 mounted upon the microscope stage 16 to be viewed through the objective 18, the specimen being mounted in conventional manner upon a slide 20. If desired, the specimen can be positioned beneath a cover glass 22. The irradiator apparatus is mounted within a casing of any conventional design, as indicated by the broken lines 23, and preferably is proportioned so that at least the left-hand portion of the apparatus as shown in FIG. 1 can be conveniently fitted beneath a microscope stage. However, the particular microscope arrangement forms no part of this invention so that the microscope can be of any conventional type suitable for use in fluorescence microscopy and can be provided with either a fixed or mechanically adjustable stage integral with or separate from the microscope. Similarly, the irradiator apparatus provided by this invention can be furnished either integral with the microscope or as a separately mounted irradiator unit and can be adapted for use with most existing microscopes. Further, although as diagrammatically illustrated herein the irradiator apparatus is adapted for substage irradiation of the specimen 14, the apparatus could be adapted in conventional manner to provide vertical irradiation of the specimen. Use of the irradiator apparatus is not limited to any phase of fluorescence microscopy, and the apparatus can be used to irradiate either specimens of materials which fluoresce naturally when so irradiated or specimens of materials which must be impregnated or otherwise treated with the proper fluorescent substances prior to irradiation.

The irradiator apparatus includes a radiation source 24 of any suitable type which is adapted to emit a substantial amount of ultraviolet radiation as indicated by the rays of radiant energy 25. The radiation source can comprise a lamp of the filament type but most advantageously comprises a lamp of the electrical arc type such as the high pressure mercury-vapor arc lamps sold under the trade designated H6 by the General Electric Company. The source can be energized from an outside power supply or from an integral power pack as desired, the power supply for the illustrated lamp 24 having the arc 24.1 being identified by the leads 24.2 to indicate that the lamp power supply can be of any conventional type.

According to this invention, the radiation source 24 is associated with a fiber optical device 26 for transmitting ultraviolet radiation from the source to the specimen 14. As shown in FIG. 3, the fiber optical device comprises a multiplicity of radiation-conducting fibers 28 which are assembled in spaced side-by-side relation within a radiation-insulating matrix 30. The device can be formed of fibers of a plastic or glass material, such as flint glass, having a relatively high index of refraction assembled within a matrix of plastic or glass material, such as crown glass, having a relatively low index of refraction, and preferably is formed of glass fibers of high index of refraction coated with glass having a low index of refraction, the fiber coatings being fused together for securing the fibers in bundled relation. Quartz fibers which absorb very little ultraviolet radiation can also be utilized within the scope of this invention. Further details as to the manufacture of the fiber optical device 26 can be found in United States Patent No. 2,825,260 issued to B. O'Brien on March 4, 1958, and in application Serial No. 669,883, now Patent No. 2,992,516, assigned to the assignee of the invention herein disclosed.

Preferably, but not necessarily, the fiber optical device 26 is tapered to have an end 26.1 of relatively large cross-sectional area adapted to receive radiation from the source 24 and an end 26.2 of relatively small cross-sectional area adapted to project radiation transmitted therethrough upon the specimen 14, tapered fibers 28 converging in the same direction being utilized in this construction. For general use, in fluorescence microscopy, the small end 26.2 of the fiber optical device is approximately 1.5 millimeters in diameter to provide irradiation of the specimen over a satisfactory field of view, and the large end of the fiber device is proportioned in view of the factors to be described below.

According to the invention, a radiation-integrating sphere 32 is disposed in surrounding relation to the source 24 and has an aperture 32.1 admitting the radiation-receiving end 26.1 of the fiber optical device 26, whereby radiant energy emitted from the source in all directions is channeled within the radiation-conducting fibers 28 of the device 26. Preferably, the inner surface 32.2 of the sphere has a reflective coating such as aluminum paint for reducing absorption of radiant energy by the sphere and to assure that substantially all energy emitted from the source is directed into the fibers 28. If desired, the inner surface of the sphere can be provided with an ultraviolet-radiating phosphor coating adapted to absorb ultraviolet rays of shorter wave length between 250 and 270 m$\mu$ and to fluoresce for emitting ultraviolet rays of longer wavelength between 360 and 380 m$\mu$. Alternatively, the inner surface of the sphere can be coated with an ultraviolet reflecting paint which is adapted to permit absorption by the sphere of other radiant energy emitted from the source. Although the radiation-integrating means is shown to comprise a spheroid, it should be understood that any comparable integrating means adapted to reflect substantially all radiation from the source into the radiation-transmitting device 26 is within the scope of this invention.

Filter means 34 of conventional type adapted to permit transmission of ultraviolet radiation only are fitted within the aperture 32.1 of the sphere in sequence with the fiber device 26 for cutting off extraneous rays of energy which are emitted from the source but which are not useful in fluorescence microscopy. Although, as illustrated, the filter means are interposed between the source 24 and the device 26, the filter means could be located at any point between the source and the specimen 14 within the scope of this invention, and could even be incorporated within the fibers 28 by use of the proper glass or other filtering material in forming the radiation-conducting fibers.

In this construction, radiant energy 25 emitted from the source 24 can impinge directly upon the end 26.1 of the fiber optical device, can be reflected from the inner surface of the integrating sphere 32 to impinge upon the fiber device end, or can be reflected first from the fiber device itself and then from the inner surface of the sphere to impinge upon the device for ultimate reception within the device fibers, whereby substantially all ultraviolet radiation from the source is distributed over the end of the fiber device with considerable uniformity, the device being adapted to transmit radiation received therein without regard to the angle of incidence of the radiation in entering the device. Use of a relatively large fiber device end 26.1 intercepts a substantial portion of the radiated energy without reflection therefrom or from the inner surface of the integrating sphere 32 and thereby assures minimum absorption of energy by the integrating sphere. Ultraviolet radiation is then transmitted through the fiber device and is projected from the device end 26.2 upon the specimen 14 with very slight diffusion. Since the ultraviolet radiation is intended to be absorbed by the specimen, the directional orientation of radiation projected from the device is not significant and, in fact, diffusion of the radiation at the end 26.2 is advantageous in helping to provide a uniformly irradiated field of view. If desired, however, suitable immersion fluids 36 which do not fluoresce, such as glycerine, and chamomile oil, can be utilized in conventional manner, as shown in FIG. 2, to gain a larger cone of radiation.

An alternate embodiment of the apparatus provided by this invention is illustrated in FIG. 4 wherein components similar to those incorporated in the embodiment of FIG. 1 are identified by corresponding, primed numbers. In this embodiment, a condensing lens means such as the two-component collimating lens system 38 are mounted within a lens tube 40 and are supported between the source 24' and the fiber device 26' by a conventional spider frame 42 for imaging the source filament 24.1' over the entire end 26.1 of the fiber device as indicated by the broken lines 44', thereby to increase uniformity of the distribution of radiant energy directed upon the specimen to be examined microscopically. This arrangement is particularly advantageous where a relatively small but intense source such as the illustrated high-pressure mercury vapor arc lamp is utilized. Further, use of such a lens system slightly increases the amount of ultraviolet radiation directed within the fiber device 26' since more radiation will impinge directly upon the device without reflection from the integrating sphere 32' and therefore without loss of energy through absorption by the sphere.

In FIG. 5 there is illustrated another embodiment of this invention which is adapted for further increasing the amount and uniformity of distribution of ultraviolet radiation directed upon the specimen to be examined microscopically. In FIG. 5 components of the apparatus similar to those illustrated in FIG. 1 are identified by corresponding, doubly-primed numbers. In this embodiment, the fiber optical device 26" comprises a multiplicity of radiation-conducting fibers 28" which are assembled in spaced, side-by-side relation within a radiation-insulating matrix 30", the fibers radially extending from a curvilinear surface 26.1" which extends partially around the source 24", and converging to a preferably smaller planar surface 26.2".

Filter means 34" are fitted over the planar surface for permitting transmission of ultraviolet radiation therethrough. As can be seen, the configuration of the fiber device 26" in this embodiment is adapted to receive a substantial amount of radiation therein without requiring reflection of said radiation from the inner surface 32.1" of the integrating sphere. Further, the device 26" is adapted to receive direct radiation from an increased part of the source arc 24.1", as indicated in FIG. 6 and therefore reduces energy absorption by the sphere 32" without incurring the installation expense or the small absorption losses inherent in the use of condensing lens as illustrated in FIG. 4. It will be understood that the curvilinear surface of the fiber device could be adapted to extend around substantially the entire periphery of the source within the scope of this invention.

Although particular embodiments of this invention have been described for the purpose of illustration, it should be understood that this invention includes all modifications and equivalents thereof which fall within the scope of the appended claims.

Having described my invention, I claim:

1. Apparatus for irradiating a specimen to be examined by fluorescence microscopy, said apparatus comprising a source of ultraviolet radiation, a radiation-transmitting device embodying a multiplicity of radiation-conducting fibers assembled in spaced side-by-side relation within a radiation-insulating matrix, said device having one end disposed for receiving radiation from said source within said fibers and having its other end disposed for directing radiation transmitted therethrough upon that portion of said specimen to be examined microscopically, radiation-integrating means disposed in surrounding relation to said source and to said radiation-receiving end of said device for directing substantially all radiation from said source upon said radiation-receiving end at diverse angles, and filter means disposed in sequence with said device for permitting transmission of ultraviolet radiation only.

2. Apparatus for irradiating a specimen to be examined by fluorescence microscopy, said apparatus comprising a source of radiant energy including ultraviolet radiation, a radiation-integrating sphere disposed in surrounding relation to said source, said sphere having an aperture therein and being adapted to reflect substantially all radiation from said source through said aperture at diverse angles, filter means adapted to transmit only ultraviolet radiation, said filter means being disposed within said aperture, and a fiber optical device embodying a multiplicity of tapered radiation-conducting fibers each initially having a radiation-insulating coating, said fibers being disposed in side-by-side bundled relation converging in the same direction for forming a device having a relatively large end and a smaller end, said device being disposed with its larger end fitted over said aperture for receiving ultraviolet radiation transmitted through the aperture within said fibers at diverse angles and having its smaller end disposed for directing said radiation at diverse angles upon that portion of said specimen to be examined microscopically.

3. Apparatus for irradiating a specimen to be examined by fluorescence microscopy, said apparatus comprising a source of radiant energy including ultraviolet radiations, a hollow spherical member disposed in surrounding relation to said source, said member having an aperture therein and having an inner reflective coating adapted to reflect substantially all radiations from said source through said member aperture at diverse angles, filter means disposed within said member aperture adapted to transmit only ultraviolet radiations, and a fiber optical device embodying a multiplicity of tapered radiation-conducting fibers each initially having a radiation-insulating coating, said fibers being disposed in side-by-side bundled relation converging in the same direction for forming a device having a relatively large end and a smaller end, said device being disposed with its larger end in registry with said member aperture for receiving ultraviolet radiations transmitted through the aperture within the device fibers at diverse angles, whereby said ultraviolet radiations can be concentrated and conducted to said smaller device end to be diffusely projected therefrom upon a specimen to be examined by fluorescence microscopy.

References Cited in the file of this patent

UNITED STATES PATENTS

| | | |
|---|---|---|
| 2,297,851 | Wyss | Oct. 6, 1942 |
| 2,423,774 | Heigl | July 8, 1947 |
| 2,561,508 | Gregorie | July 24, 1951 |
| 2,686,452 | Bentley | Aug. 17, 1954 |
| 2,702,862 | Finney | Feb. 22, 1955 |
| 2,825,260 | O'Brien | Mar. 4, 1958 |
| 2,843,664 | Olin | July 15, 1958 |